United States Patent
Yoshida

[11] Patent Number: 5,142,328
[45] Date of Patent: Aug. 25, 1992

[54] COATING MATERIAL FOR ELIMINATING OZONE AND ELECTRONIC IMAGE PROCESSING APPARATUS HAVING THE SAME

[75] Inventor: Takeshi Yoshida, Kawachinagano, Japan

[73] Assignee: Mita Industrial Co., Ltd., Osaka, Japan

[21] Appl. No.: 567,071

[22] Filed: Aug. 14, 1990

[30] Foreign Application Priority Data

Aug. 31, 1989 [JP] Japan ............................. 1-226689

[51] Int. Cl.⁵ .......................................... G03G 21/00
[52] U.S. Cl. ...................................... 355/215; 34/82; 55/DIG. 42; 355/30; 355/298; 423/219
[58] Field of Search ................ 355/215, 30, 219, 297, 355/298; 118/652; 55/387, 74, DIG. 42; 204/176; 34/80, 82; 423/210, 219

[56] References Cited

U.S. PATENT DOCUMENTS

| | | | |
|---|---|---|---|
| 3,675,096 | 7/1972 | Kless | 250/326 |
| 4,143,118 | 3/1979 | Laing | |
| 4,264,184 | 4/1981 | Nishikawa et al. | |
| 4,315,837 | 2/1982 | Rourke et al. | 502/402 |
| 4,388,274 | 6/1983 | Rourke et al. | |
| 4,401,385 | 8/1983 | Katayama et al. | 118/652 X |
| 4,466,813 | 8/1984 | Avritt et al. | 55/74 |
| 4,540,268 | 9/1985 | Toyono et al. | |
| 4,853,735 | 8/1989 | Kodama et al. | 355/215 |
| 4,939,543 | 7/1990 | Barker | 355/215 |

FOREIGN PATENT DOCUMENTS 59-57258 4/1984 Japan.
60-17765 1/1985 Japan.
61-31477 2/1986 Japan.

OTHER PUBLICATIONS

Patent Abstract of Japan, vol. 13 No. 172 (P-862) (3520), Apr. 24, 1989.
Patent Abstracts of Japan, vol. 9, No. 137, (P-363) (1860), Jun., 1985.
Patent Abstracts of Japan, vol. 10, No. 185, (C-357) (2241), Jun. 1986.
Patent Abstracts of Japan, vol. 9, No. 253, (P-395) (1976), Oct., 1985.

*Primary Examiner*—A. T. Grimley
*Assistant Examiner*—Matthew S. Smith
*Attorney, Agent, or Firm*—Beveridge, DeGrandi & Weilacher

[57] ABSTRACT

An apparatus for forming an image by electrostatic charge comprises an image forming part including a photoconductive drum and an electrostatic charger for forming an image by electrostatic charge, and an ozone eliminating filter located in the air flow generated by the rotation of the photoconductive drum. The ozone eliminating filter includes a coating layer made of a coating material to eliminate ozone in the ambient air. The coating material includes an ozone eliminating substance an organic binder and a foaming agent. The ozone eliminating filter may be made of adhesive double-coated tape which includes an ozone eliminating substance on one side.

12 Claims, 2 Drawing Sheets

COATING MATERIAL FOR ELIMINATING OZONE AND ELECTRONIC IMAGE PROCESSING APPARATUS HAVING THE SAME

BACKGROUND OF THE INVENTION

The present invention relates to coating material and an electronic image processing apparatus. More specifically, it relates to coating material for eliminating ozone and an electronic image processing apparatus having the same which forms an image by means of electrostatic charge. By way of clarity, in the specification the word "eliminating" is defined to be both decomposing and adsorbing.

Electronic image processing apparatuses containing an electrostatically-charging image forming part generate ozone during the steps of charging a photoconductive member to a predetermined level of electric charge, transforming a toner image from the photoconductive member to a sheet of material paper, and removing the sheet having the received toner image from the photoconductive member. In these steps, activated particles of oxygen are generated by the inelastic collision of oxygen molecules and the charged particles generated by ionization of the air, due to corona discharge. The activated particles and oxygen molecules react to generate ozone.

The ozone can be adsorbed by the surface of the photoconductive member, forming an oxidized layer which lowers the resistance of the surface of the photoconductive member. If the photoconductive member is made of an organic photoconductive material, the photoconductive member can react with the ozone, lowering the sensitivity of the photoconductive member. These may cause improper developing by, for example, fading and spreading of the image on the photoconductive member.

Furthermore, the ozone generated in the electronic image processing apparatuses is discharged to the outside by a fan or the like, increasing the ozone concentration in the ambient air. A high concentration of ozone in the ambient air can have an adverse affect on the human body.

SUMMARY OF THE INVENTION

It is an object of the present invention to provide coating material for eliminating ozone which can form an ozone eliminating filter to efficiently eliminate ozone.

It is another object of the present invention to provide an ozone eliminating filter for efficiently eliminating ozone.

It is a further object of the present invention to provide an ozone eliminating filter which is easily installed.

It is yet another object of the present invention to provide an electronic image processing apparatus wherein ozone is efficiently eliminated.

It is yet another object of the present invention to provide an electronic image processing apparatus which decreases the ozone concentration in the exhaust air of the apparatus.

(1) According to an aspect of the present invention, coating material for eliminating ozone comprises a substance for eliminating ozone, an organic binder and a foaming agent.

The coating material herein forms an ozone eliminating filter, consisting in a porous layer which incorporates the ozone eliminating substance foamed by means of the foaming agent. This ozone eliminating filter is of large area for contact with ozone molecules, whereby ozone may be effectively eliminated.

(2) According to another aspect of the present invention, an ozone eliminating filter comprises an adhesive double-coated tape, and a substance for eliminating ozone adhered to at least one side of the adhesive double-coated tape.

Since the ozone eliminating filter incorporates the adhesive double-coated tape, the filter can be easily placed in positions in an electronic image processing apparatus where ozone is generated. Thus, the ozone eliminating filter can efficiently eliminate ozone in the apparatus.

(3) According to another aspect of the present invention, an electronic image processing apparatus is for forming an image by means of electrostatic charge. The apparatus comprises an image forming part having a photoconductive drum and an electrostatic charging device for forming an image by means of electrostatic charge, and an ozone eliminating filter disposed in the air flow generated by the rotation of the photoconductive drum.

In the electronic image processing apparatus, the image forming part forms an image on the photoconductive drum by means of electrostatic charge. The electrostatic charging device generates ozone as a side effect. The ozone is circulated in the air flow generated around the photoconductive drum by the rotation of the photoconductive drum. However, the circulating ozone is eliminated by the ozone eliminating filter located in the air flow. Accordingly, the concentration of ozone in the electronic image processing apparatus is decreased, whereby deterioration of the photoconductive drum due to contact with ozone is minimized, and the concentration of ozone is decreased in the exhaust air.

These and other objects and advantages of the present invention will be more fully apparent from the following detailed description.

DESCRIPTION OF THE PREFERRED EMBODIMENT

Figure 1:
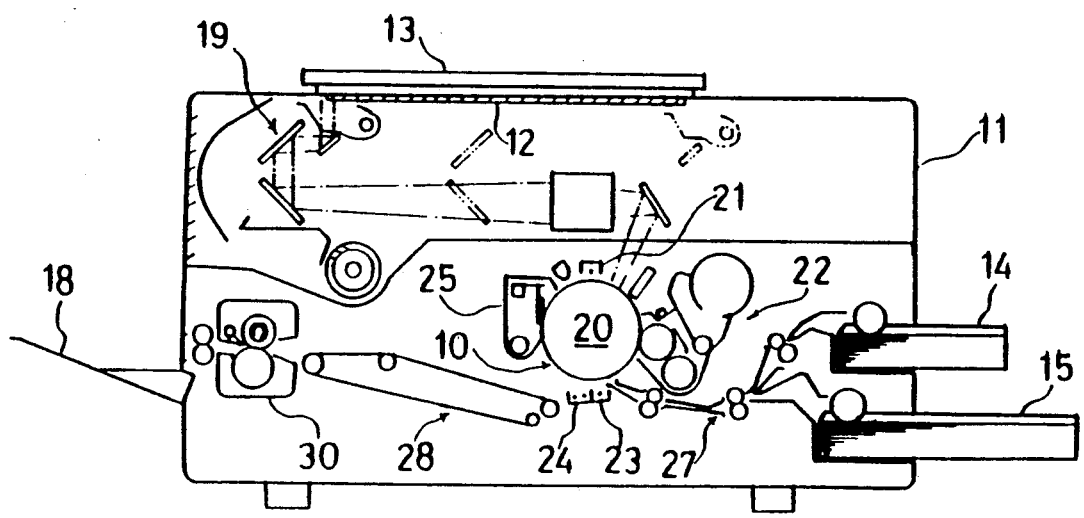
FIG. 1 is a sectional schematic view showing an embodiment according to the present invention.

FIG. 1 is a sectional schematic view showing a copying machine to which an embodiment of the present invention is applied. In the figure, a copying machine body 11 has a contact glass 12 in the upper surface and an original holder 13 thereon which can be opened. On the right side of the machine body in the figure, detachable paper cassette cases 14 and 15 are attached. On the left side of the machine body 11, a copy tray 18 is attached wherein copied paper is received.

In the machine body 11, an optical exposure system 19 for obtaining information from the original image is located in the upper portion. The exposure system 19 consists of a light source, mirrors, etc. Disposed in the central portion of the machine body 11 is an image forming part 10. A paper transportation path 27 is provided between the paper cassette cases 14 and 15 and the image forming part 10, and a paper discharging path 28 is provided to the left of the image forming part 10. Provided between the paper discharging path 28 and the copy tray 18 is a fixing unit 30 for fixing a transferred image onto the transported sheet.

Figure 2:
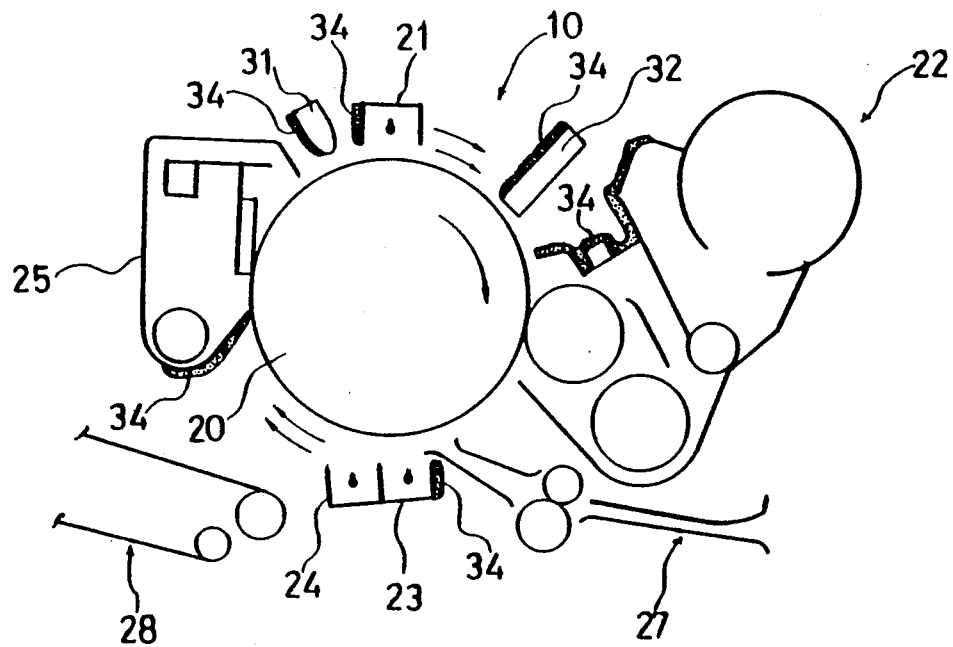
FIG. 2 is a sectional schematic view showing an image forming part thereof.

FIG. 2 shows the structure of the image forming part 10. A photoconductive drum 20 on which an electrostatic latent image is formed is located in the central part of the image forming part 10. Surrounding the photoconductive drum 20, there are a main charger 21 for charging the photoconductive drum 20 to a predetermined level of electric charge; a blank lamp unit 32 for trimming and masking an electrostatic latent image on the photoconductive drum 20; a developing unit 22 for developing the electrostatic latent image; a transferring device 23 for transferring a toner image to a sheet of material paper; a detaching device 24 for detaching the sheet from the photoconductive drum 20; a cleaning unit 25 for removing toner from the photoconductive drum 20; and an erasing lamp unit 31 for erasing electric charge remaining on the photoconductive drum 20, in that order. The photoconductive drum 20 is driven by a driving motor (not shown) to rotate in the direction shown by the arrow, whereby an air flow, as shown by the double arrows, is generated around the photoconductive drum 20.

In the image forming part 10, the main charger 21 and each of the like surrounding the photoconductive drum 20 has a coating layer 34, or an ozone eliminating filter, made of coating material for eliminating ozone, on the outer surface against the air flow. The coating material for eliminating ozone used in the coating layers 34 includes, for example, a substance for decomposing ozone or a substance for adsorbing ozone. The ozone decomposing substance may be a powder of palladium carbon, a metal oxide such as manganese dioxide or lead peroxide, a metal such as nickel or rhodium, or a binary composite oxide consisting of titanium and silicone. A powder of the binary composite oxide consisting of titanium and silicone increases ozone decomposing efficiency when it is used with manganese dioxide. The ozone adsorbing substance may be activated carbon, silica gel or alumina.

The coating layers 34 of the ozone eliminating material can be formed of coating material consisting of an organic binder with an ozone eliminating substance dispersed in the binder, on the outer surfaces of the main charger 21, etc. The organic binder used in the coating material may be an emulsion including a polymer of polyacrylicester type (for example, polycyanoacrylate), polymetacrylicester type, poly(vinyl acetate) type or polyethylene type; a copolymer of vinyl acetate/acrylicester type or styrene/butadiene type; acetal resin; butylal resin; polyimide resin; or polyamide resin. These kinds of organic binder usually consist of a solid component which ranges from 2 to 100 weight percent—preferably from 5 to 50 weight percent. The mixing ratio of the ozone eliminating substance to an organic binder of 100 parts by weight—may range from 3 to 100 parts by weight, preferably from 5 to 50 parts by weight. If the parts of the ozone eliminating substance were less than 3 parts by weight, sufficient ozone eliminating effect would not be obtained. Moreover, if the parts of the ozone eliminating substance were more than 100 parts by weight, the manufacturing cost would be increased without further benefits. Furthermore, the coating layers 34 of the ozone eliminating substance could easily become detached in such cases.

The coating material for making the coating layers 34 for the elimination of ozone may be foamable. A foamable coating material may consist of a foaming agent added to a coating material consisting of an ozone eliminating substance, an organic binder as described above, and a solvent. The foaming agent is, for example, sodium bicarbonate, ammonium carbonate, dinitrosopentamethylenetetramine, azobisformamide, azobisisobutyronitryl, bariumazodicarboxylate, or trihydrazinotriazine. More specifically, foaming material can be selected from the following:

(1) A mixture of manganese dioxide of 80 parts by weight, butylal resin of 10 parts by weight, and ammonium carbonate of 0.05 parts by weight, which are dissolved in ethanol of 100 parts by weight.

(2) A mixture of palladium carbon powder of 95 parts by weight, butylal resin of 10 parts by weight, and dinitrosopentamethylenetetramine of 0.03 parts by weight, which are dissolved in ethanol of 100 parts by weight.

(3) A mixture of mixed powder of manganese dioxide and binary composite oxide consisting of titanium and silicon of 100 parts by weight, acrylic resin of 10 parts by weight, and azobisformamide of 0.08 parts by weight, which are dissolved in toluene of 80 parts by weight.

The coating material including an ozone eliminating substance described above may be applied to a device by, typically, spraying or brush painting. The solvent is removed from the applied coating substance by, typically, a heating process at 100° C. for one minute, whereby the ozone eliminating substance is baked on, to form the coating layers 34 for eliminating ozone on the main charger 21, etc.

Wherein the foaming material is used, porous coating layers 34 for eliminating ozone are formed by means of the foaming agent.

The operation of the above embodiment will henceforth be described.

In the copying machine, negative corona discharging is carried out at the main charger 21, the transferring device 23, and the detaching device 24 of the image forming part 10, while image processing is taking place. Ozone is generated as a side effect at the main charger 21, the transferring device 23, and the detaching device 24.

The ozone is circulated around the photoconductive drum 20 due to the air flow surrounding the photoconductive drum 20. The air flow encounters the coating layers 34 for the elimination of ozone, whereby the ozone in the air flow is decomposed or adsorbed by the ozone eliminating substance of the coating layers 34. Thus, the ozone generated at the main charger 21, etc., is effectively eliminated. Therefore, the concentration of ozone in the copying machine is decreased, whereby the photoconductive material of the photoconductive drum 20 is maintained at quality; and the concentration of ozone in the exhaust air is also decreased.

Wherein the coating material includes a foaming agent, the applied layers 34 for the elimination of ozone are made porous. Thereby, the coating layers 34 have maximal surface for contact with ozone molecules, whereby ozone is effectively eliminated.

MODIFICATIONS (a) Instead of the coating layers 34 as in the above embodiment, a porous filter including an ozone eliminating substance may be provided, for example, between the main charger 21 and the blank lamp unit 32, or between the blank lamp unit 32 and the developing unit 22.

Although an additional member, i.e., a filter, must be required in this embodiment, the filter may be provided with a large surface which includes the ozone eliminating substance for contact with ozone, whereby ozone is effectively eliminated.

Figure 3:
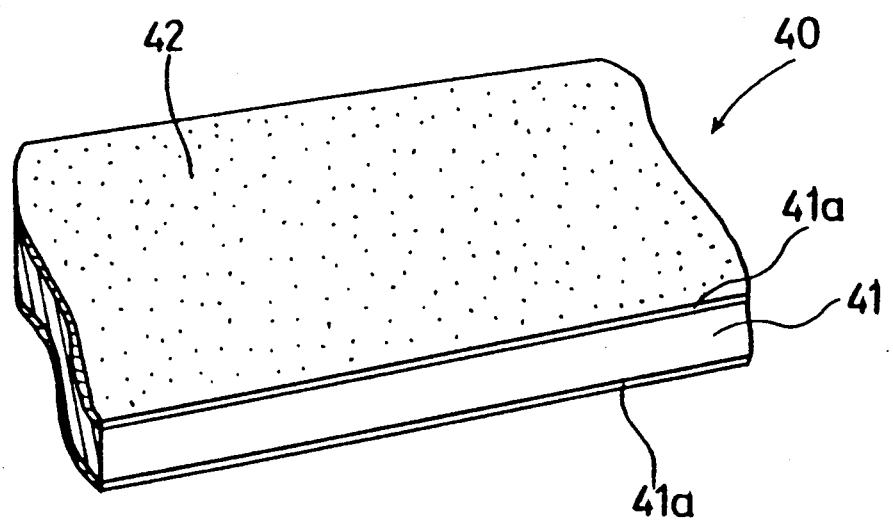
FIG. 3 is an isometric schematic view showing an ozone eliminating filter according to another embodiment of the present invention.

(b) Instead of the coating layers 34 in the above embodiment, a tape-like shaped filter, shown in FIG. 3, for eliminating ozone may be employed which is affixed to the main charger 21, etc.

In FIG. 3, the filter 40 consists of an adhesive double-coated tape 41 having adhesive layers 41a on both sides, one of which contains a powder 42 of an ozone eliminating substance.

The filter 40 can be easily affixed to the main charger 21, etc., and may be easily replaced, so that high efficiency of eliminating ozone can be maintained in an electronic image processing apparatus.

(c) A filter for eliminating ozone in accordance with the present invention may be used in a driving motor, a detaching device, and a processing cartridge having a lattice which consists of plates separate from each other by a small gap, in order to let exhaust air escape.

EXPERIMENTS

Experiment 1

A coating material was made by adding vanadium oxide of 50 parts by weight to a solid binder of 100 parts by weight which consisted of a polymer emulsion of poly(vinyl acetate) containing solid of 5 weight percent.

The obtained coating material was used to coat parts in a copying machine in a similar manner to the parts as shown in FIG. 2, and then it was dried to form the coating layers.

A copying process was carried out in the copying machine incorporating the coating material. Ozone concentration in the exhaust air from the copying machine was measured with an ozone monitor (EG-2001; Ebara-jitsugyosha) just after 100 copies were made. The ozone concentration was 0.2 ppm.

Experiment 2

A coating material was made by dissolving a mixed powder of 100 parts by weight of manganese dioxide and a binary composite oxide of titanium and silicon, acrylic resin of 10 parts by weight, and azobisformamide of 0.08 parts by weight into toluene of 80 parts by weight.

The obtained coating material was used to coat the parts in a copying machine in a similar manner to the parts as shown in FIG. 2, and then the material was dried to form coating layers. The formed applied layers had a porous surface.

The ozone concentration of the copying machine was measured in a like manner to Experiment 1. The ozone concentration was 0.1 ppm.

COMPARATIVE EXAMPLE

The ozone concentration of an ordinary copying machine which has no coating layers of the present invention was measured in a like manner to Experiment 1.

The ozone concentration was 1.5 ppm.

Various details of the invention may be changed without departing from its spirit not its scope. Furthermore, the foregoing description of the embodiments according to the present invention is provided for the purpose of illustration only, and not for the purpose of limiting the invention as defined by the appended claims and their equivalents:

What is claimed is:

1. A coating material for forming a coating layer to eliminate ozone from ambient air, comprising: manganese dioxide, a butylal resin, and ammonium carbonate.

2. The coating material according to claim 1, wherein the parts by weight of said manganese dioxide ranges from 3 to 100 parts corresponding to 100 parts by weight of said butylal resin.

3. The coating material according to claim 2, wherein the parts by weight of said manganese dioxide ranges from 5 to 50 parts.

4. The coating material according to claim 3, further including an ozone decomposing substance.

5. The coating material according to claim 4, further comprising ethanol as a solvent; wherein 80 parts by weight of said manganese dioxide, 10 parts by weight of said butylal resin and 0.05 parts by weight of said ammonium carbonate are dissolved in 100 parts by weight of said ethanol.

6. A coating material for forming a coating layer to eliminate ozone from ambient air, comprising: a palladium-carbon powder, a butylal resin, and dinitrosopentamethylenetetramine.

7. The coating material according to claim 6, wherein the parts by weight of said palladium-carbon powder ranges from 3 to 100 parts corresponding to 100 parts by weight of said butylal resin.

8. The coating material according to claim 7, wherein the parts by weight of said palladium-carbon powder ranges from 5 to 50 parts.

9. The coating material according to claim 8, further comprising ethanol as a solvent, wherein 95 parts by weight of said palladium-carbon powder, 10 parts by weight of said butylal resin, and 0.03 parts by weight of said dinitrosopentamethylenetetramine are dissolved in 100 parts by weight of said ethanol.

10. A coating material for forming a coating layer to eliminate ozone from ambient air, comprising: a powder of a binary composite oxide of titanium and silicon, manganese dioxide, an acrylic resin, azobisformamide, and toluene, wherein a mixed power of 100 parts by weight of said manganese dioxide and said binary composite oxide of titanium and silicon, 10 parts by weight of said acrylic resin, and 0.08 parts by weight of azobisformamide are dissolved in 80 parts by weight of said toluene.

11. The coating material according to claim 10, wherein the parts by weight of said binary composite oxide of titanium and silicon ranges from 3 to 100 parts corresponding to 100 parts by weight of said acrylic resin.

12. The coating material according to claim 11, wherein the parts by weight of said binary composite oxide of titanium and silicon ranges from 5 to 50 parts.

* * * * *